Jan. 14, 1964     A. KAUFMAN     3,118,063
HORIZON SENSORS SELECTIVELY RESPONSIVE TO
A GASEOUS ATMOSPHERIC COMPONENT
Filed Oct. 19, 1960

INVENTOR.
ARTHUR KAUFMAN
BY
Robert Ames Norton
ATTORNEY

United States Patent Office 3,118,063
Patented Jan. 14, 1964

3,118,063
HORIZON SENSORS SELECTIVELY RESPONSIVE TO A GASEOUS ATMOSPHERIC COMPONENT
Arthur Kaufman, Stamford, Conn., assignor to Barnes Engineering Company, Stamford, Conn., a corporation of Delaware
Filed Oct. 19, 1960, Ser. No. 63,623
10 Claims. (Cl. 250—83.3)

This invention relates to improved horizon sensors and to methods of using them.

Horizon sensors are commonly used in satellites, missiles and some high flying aircraft. They have resulted in great advances in maintaining level flight or predetermined attitudes of components of the vehicles. Essentially, the horizon sensors operate by sensing the sharp radiation discontinuity which is presented at the earth's horizon. For the most part, horizon sensors utilize infrared radiation comparing the practically zero radiation of space with the substantial radiation of the earth.

Various types of scans are used, for example there may be a conical scan in which the sensor successively receives radiation across the earth and then from space on either side of the horizon. Oscillatory scans have also been developed and in the case of some satellites which rotate fixed detecting means effect the scan as a result of the rotation of the whole vehicle. Conical scans vary from cones which may be typically of a 110° angle up to cones where the apex angle is 180° which results in a circular scan.

The present invention is applicable to all types of horizon sensors, but as will appear from the discusison of the problems set out below, the improvements are greater with conical or circular scans where the scan extends across a substantial portion of earth rather than only a narorw band at the horizon as is the case with some oscillatory scanning sensors.

The main problem is presented in the daytime when the earth is illuminated by sunlight. The horizon sensor receives radiation not only as a result of the warmer temperature of the earth, but also reflected radiation from clouds which latter can be a serious factor and can lead to problems which might be called "false horizon problems." Oscillatory scanners which oscillate only in a narrow band at the horizon do not present the above problem in quite so extreme form as, of course, they are not affected unless there is cloud cover near the horizon. The present invention is useful for this type of oscillatory scanner but the improvement in accuracy is not as spectacular as with the scanning pattern which extends across the earth's apparent disc.

Essentially, the present invention does not utilize radiation from the earth or from the clouds at all, either reflected or self-emitted. The radiation used is from gaseous components of the atmosphere. The minimum path for full radiation is sufficiently short so that the radiation comes only from the stratosphere or even higher and so is far above any cloud cover. The sensor is, therefore, blind to any radiation reflected from clouds and so there is no problem of "false horizon." Because of the fact that the sensor sees a disc that is somewhat greater than that of the earth itself by the extent of the atmosphere at either edge, a correction has to be made in the case of sensors which combine the functions of horizon sensing with altitude information. The correction is only of real significance for objects that are fairly near the earth, such as high flying aircraft. Satellites, particularly those having an orbit many hundreds of miles above the earth, are so far removed that the effect of the expanding of the earth's apparent disc by the present invention is negligible. In any event, even when sensors with altitude information are used at most there is required a calibration which takes into consideration the somewhat expanded apparent disc of the earth.

There are several components of the atmosphere which have strong absorption and hence emission bands. The three with the strongest bands are water, ozone and carbon dioxide. While it is possible to use any of them, water vapor is relatively less desirable. The concentration of water vapor above the level of the highest clouds is not constant and varies from day to day and even from latitude to latitude on the same day. Therefore, while it is possible to use water vapor in horizon sensors of the present invention, it is less desirable than the other gases.

Ozone shows a fairly uniform distribution insofar as path lengths of the present invention is concerned and it has a sharp absorption band at about 9.6 to $10\mu$. However, the layer of ozone does not remain always at a constant altitude and, in fact, always occurs at quite high altitudes. This means that the extension of the earth's apparent disc is relatively large and is not constant. For straight horizon sensing work this is more or less immaterial as all that is needed is a sharp horizon which is symmetrical but where altitude information is to be given also calibration cannot be made to stay as accurate.

Carbon dioxide, which has an absorption band around $15\mu$ is an excellent emitter at the temperatures generally prevailing which approximate 200 to 220° K. and its distribution throughout the atmosphere is quite uniform with altitude up to a height which is far above the occurrence of clouds. Therefore, although the invention is not limited thereto, the use of carbon dioxide as an emitter presents some real advantages and so may be considered as the preferred modification of the invention. It should be noted that it is not necessary, particularly where only horizon sensing is required, that a single gas be used. It will be pointed out below that a very simple type of selective radiation detector is effective in both the ozone and carbon dioxide type bands and effectively eliminates other radiation which might be involved in cloud reflection. Therefore, it is possible and for some purposes even desirable to use both ozone and carbon dioxide bands.

While it is possible to utilize filters in the present invention simple filters are not readily obtainable with a degree of sharpness desired in the ranges of infrared in question, for example from about 9 to $16\mu$. Nevertheless, the present invention includes the use of simple filters. Selective detectors, with or without broad cutting filters which are readily available, present advantages and are preferred. These selective detectors are described and claimed in the patents to Barnes, Wormser and De Waard, No. 2,981,913, April 25, 1961, and De Waard, No. 2,994,053, July 25, 1961. The latter is particularly useful and will be described in conjunction with a specific embodiment of the present invention. Of course, the selective heat detectors per se are not the subject matter of the present invention.

Where greater precision in the selection of bands is to be used, various sharp reflection or dispersion elements may be used. For example, a prism or a suitably blazed diffraction grating may be employed. These devices give great precision but the resulting bands are quite narrow and so the amount of energy is not as high as when broader bands are utilized.

Another type of reflection device is one which produces a residual reflected ray. For example a block of magnesium oxide will produce a residual reflected ray with a sharp short wave cutoff at $13\mu$. The residual reflected ray alone does not have a sharp long wave cutoff and extends out beyond $25\mu$. This can be reduced by suitable simple filters such as a thin layer of mica to produce a band of about $1\mu$ either side of $15\mu$. Essentially gratings and devices producing residual reflected rays may be considered as reflection filters as contrasted to transmission filters. A selective detector utilizing residual reflected rays is described and claimed in the patent to Rudomanski, De Waard and Wormser, No. 3,091,693, May 28, 1963. These detectors, which include reflection type filters, while extremely effective as far as band width selection is concerned are somewhat more bulky and no not in general lend themselves to inline optics. Therefore, the simpler selective detectors such as those described in the applications above referred to present advantages. In the present invention where extreme sharpness of band selection is often not necessary such simpler and lighter detector constructions present real practical advantages, particularly for satellite work.

The invention will be described in greater detail in connection with the drawings in which.

Figure 3:
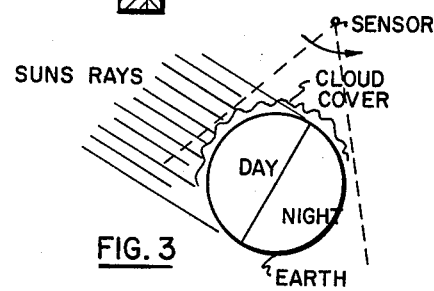
FIG. 3 is a diagram of the cloud reflection phenomenon.
Figure 4:
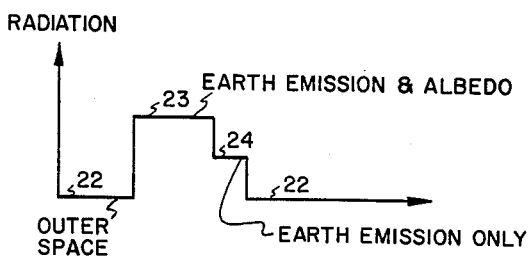
FIG. 4 is a diagram of the radiation in FIG. 3.

FIGS. 3 and 4 illustrate the problem which is solved by the present invention. In FIG. 3, it will be noted that as the scan moves across the earth's disc, there is first a horizon between space and the radiation from earth emission and cloud reflection. Then the scan passes across the line of sunset and radiation is received only from the earth emission. Finally the scan crosses the night horizon back to space. FIG. 4 shows the relative intensities of radiation, first the very low or zero radiation of space 22 then a sudden jump to a high radiation 23 which is made up of both of the emission of the earth and of the reflection from the cloud cover. Then as the sunset line is crossed, the radiation drops to an intermediate level 24 and finally, when the night horizon is crossed, to the radiation level of space 22. It will be seen that there is quite a sharp drop from the level of 23 to the radiation level 24. This drop is sufficient so that the horizon sensor may interpret it as a discontinuity or false horizon. Only a single false horizon is shown but, of course, if the cloud cover were intermittent instead of continuous as shown in FIG. 3 there might be several radiation discontinuities though not as large as the drop to the radiation level 24 because where there is no cloud cover there would be some sunlight reflected from the earth even though not as much as from the cloud.

Figure 5:
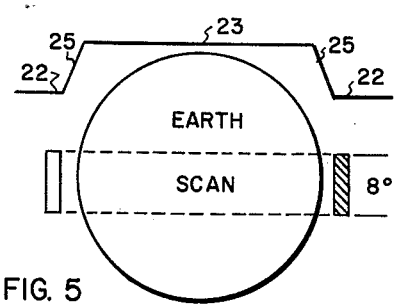
FIG. 5 is a diagrammatic representation of a scan obtained by the horizon sensor of FIG. 1.

FIG. 5 shows a scan across the earth somewhat off center as is the case with most conical scans. Here the radiation is shown to jump from the level 22 for space to the level 23 which is represented by the radiation emitted from the carbon dioxide of the air. At the horizon there will be gradients shown at 25, somewhat exaggerated as in practice they will be much steeper, but they are symmetrical and there are no gradients or sharp discontinuities anywhere throughout the radiation plateau represented by 23 which corresponds to the scan across the earth's disc. Accordingly, there is no false horizon.

The present invention will be illustrated in connection with a typical conical scan horizon sensor shown in FIG. 1. This type of sensor is described and claimed in the patent to Monty M. Merlen, No. 3,020,407, Feb. 7, 1962. Only the horizon sensor and a detailed enlarged view of the selective detector of FIG. 2 is shown as the present invention is concerned only with the sensor and does not alter the electronic amplifying and processing circuits. Accordingly, these are not shown. The sensor shown in FIG. 1 consists of a rear cover 1, bolted to a front plate 2 on which is mounted a germanium lens onto which the detector 5, (see FIG. 2), is attached to form a high speed immersion lens. The sensor is driven by a drive motor and is also provided with a magnetic pick up coil producing a reference signal at a predetermined orientation of the sensor scanning. The motor drives a rotating assembly 8 journaled on ball bearings 9 on the mount 3 in which the detector and lens are mounted. At the forward end of 8 is a mounting 10 carrying a scanning prism 11 which scans a 110° cone. The front plate 2 also carries two high speed synchronous SPDT switches 12. The switches would be obscured by the scanning head and so one of them is shown in dotted lines in a position 90° away from its normal position. The operation of this switch is, of course, not affected by its particular location on the front plate.

A filter 15 is also carried by the assembly 8. The filter is an interference filter for rejecting radiation at approximately $9.6\mu$. The filter is of standard design being a sandwich of a layer of sodium chloride, a half wavelength thick, between two tellurium layers 0.8 of a quarter wavelength thick. The whole is mounted on a sodium chloride substrate sufficiently thick to give satisfactory mechanical strength.

The electronic processing circuits are mounted on a circuit board 17 which is attached to the front plate 2. A sun shutter 16 is also carried by the assembly 8 and opens by centrifugal force when the assembly rotates. This shutter is conventional and prevents exposure to the sun when the sensor is not turning and so guards against damage from excessive heating.

Figure 1:
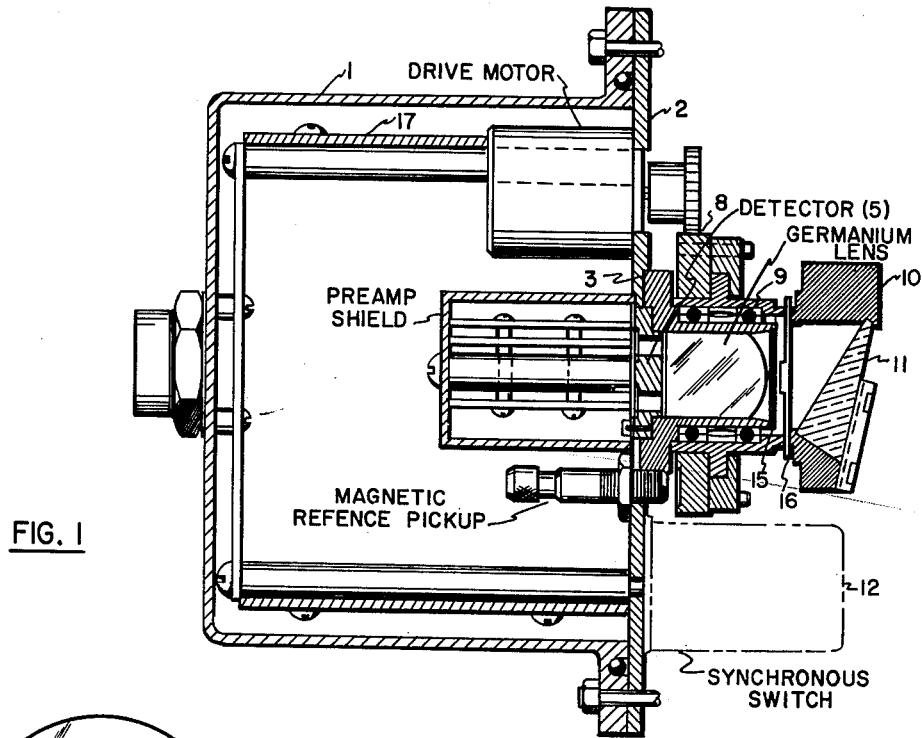
FIG. 1 is a section through a typical conical scanning horizon sensor.
Figure 2:
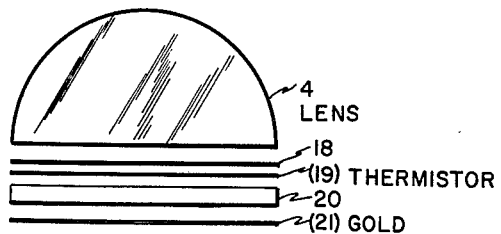
FIG. 2 is a detail on an enlarged scale of the detector of FIG. 1.

The construction of the selective detector is shown in FIG. 2, the lens 4 bearing the same reference numeral as in FIG. 1. A thin insulating layer of selenium 18 is on the rear of the lens followed by a thermistor 19 which is a very thin plate of germanium or silicon. The thickness may be from one to several microns. The next layer 20 is of talc and it is much thicker than the preceding layer, for example, 10 to 50 times as thick or more. Finally, there is a thin layer of gold foil 21 which acts as a mirror. Because of the thinness of the layers, FIG. 2 shows the detector slightly exploded and with film thickness exaggerated. In fact, there is no spacing between the layers, so that the thermistor 19 is effectively immersed in the lens 4.

In operation the sensor of FIG. 1 scans in a cone which cuts across the earth's disc as shown in FIG. 5. The radiation is from beyond the ozone band at 9.6 to $10\mu$ and includes the whole of the carbon dioxide long wave infrared band. If desired to eliminate some of the far infrared radiation beyond $16\mu$ a very thin layer of mica may be added to the filter 15. The carbon dioxide of the atmosphere is the main emitter and this emission is not influenced significantly by reflection of sunlight from the clouds. Accordingly, as shown in FIG. 5 there are no false horizons and the gradients at the horizon are perfectly symmetrical, although as pointed out above, they are shown as exaggerated slopes. Actually they are quite steep. The sensor operates reliably day or night and regardless of cloud cover or of the temperature of the earth itself near the horizons. For example, if the scan at one horizon scanned across part of the antarctic and the other horizon the tropics, there would be no difference in the discontinuity because the temperature of the carbon dioxide in the upper atmosphere is substantially the same regardless of latitude. The sensor always senses true horizons, there are no false indications.

The simple filter and selective detector shown are quite adequate for many uses and present the advantage of completely inline optics. If higher precision is required, the selective detector can receive rays from residual reflected ray surface of a block of magnesium oxide as described in the Rudomanski, De Waard and Wormser patent referred to above. When this is used with the additional mica window referred to, a very sharp band of about 14.5 to $15.5\mu$ is passed including emission only from carbon dioxide. This permits maximum precision but at the expense of somewhat heavier and more cumbersome optics.

If desired, the filter 15 may be replaced by one which cuts off at wavelengths shorter than about 9μ. This permits the sensor to receive radiation both from carbon dioxide and from ozone. Greater energy is achieved with a slight impairment of precision due to the movement of the ozone layer. Generally, the sharp band of carbon dioxide alone has sufficient energy and can be used practically with optics of moderate size.

I claim:

1. A horizon sensor comprising in combination and in optical alignment,
   (a) scanning means for scanning at least one horizon and including infrared detecting means,
   (b) the infrared detecting means being selective and being unresponsive to diffusely reflected sunlight but selectively responsive substantially only to longer infrared radiation of at least one band of emission of a gaseous atmospheric component.

2. A horizon sensor according to claim 1 in which the selective detecting means is responsive to long wave infrared radiation in the 15μ carbon dioxide emission band.

3. A horizon sensor according to claim 2 in which the selective detecting means includes means for filtering out infrared radiations of shorter wavelength than the 15μ carbon dioxide emission band.

4. A horizon sensor according to claim 1 in which the selective infrared detecting means comprises a thermal detector consisting of a thin plate of a semiconductor included in the group consisting of germanium and silicon, a layer of material absorbing infrared selectively in at least the 15μ carbon dioxide emission band, said layer being in intimate heat conducting contact with the thermal detector and a mirror surface reflecting infrared radiation back through the layer.

5. A horizon sensor according to claim 4 in which the selecting layer is talc.

6. A horizon sensor according to claim 5 in which the thermal detector is immersed on a lens.

7. A horizon sensor according to claim 6 including filtering means for filtering out infrared radiation in the 9 to 10μ absorption band of the talc.

8. A horizon sensor according to claim 7 including filtering means of a residual reflected ray type.

9. A horizon sensor according to claim 8 in which the means of the residual reflected ray type consists of a block of magnesium oxide.

10. A horizon sensor according to claim 9 in which the selective detecting means includes filtering means rejecting infrared radiation longer than about 16μ.

References Cited in the file of this patent

UNITED STATES PATENTS

| | | |
|---|---|---|
| 2,742,550 | Jenness | Apr. 17, 1956 |
| 2,844,033 | Tandler et al. | July 22, 1958 |
| 2,856,540 | Warshaw | Oct. 14, 1958 |
| 2,949,536 | Langton | Aug. 16, 1960 |
| 2,956,170 | Sibley | Oct. 11, 1960 |
| 2,964,636 | Cary | Dec. 13, 1960 |
| 2,975,283 | Morton | Mar. 14, 1961 |
| 2,982,856 | Camp | May 2, 1961 |
| 2,983,823 | Oberly | May 9, 1961 |
| 2,994,053 | De Waard | July 25, 1961 |
| 2,999,163 | Beese | Sept. 5, 1961 |
| 3,020,406 | Witney | Feb. 6, 1962 |
| 3,023,661 | McClusky et al. | Mar. 6, 1962 |
| 3,031,576 | Loy | Apr. 24, 1962 |
| 3,038,077 | Gillespie et al. | June 5, 1962 |
| 3,062,958 | Warner | Nov. 6, 1962 |
| 3,090,583 | Behun et al. | May 21, 1963 |
| 3,091,693 | Rudomanski et al. | May 28, 1963 |